United States Patent [19]

Furukawa et al.

[11] Patent Number: 4,482,678

[45] Date of Patent: Nov. 13, 1984

[54] DIENE RUBBER COMPOSITION AND TIRE USING IT IN TREAD

[75] Inventors: Hiroshi Furukawa, Ashiya; Yuichi Saito, Nishinomiya; Akio Imai, Ichihara; Nobuyuki Yoshida, Ichihara; Yasushi Okamoto, Ichihara, all of Japan

[73] Assignees: Sumitomo Rubber Industries, Ltd., Kobe; Sumitomo Chemical Company, Limited, Osaka, both of Japan

[21] Appl. No.: 525,698

[22] Filed: Aug. 23, 1983

[30] Foreign Application Priority Data

Aug. 23, 1982 [JP] Japan ................................ 57-146459

[51] Int. Cl.$^3$ .......................... C08L 7/00; C08L 9/00; C08L 9/06
[52] U.S. Cl. .................................. 525/236; 525/331.9; 525/332.9; 525/342; 525/357; 525/359.1; 525/386; 525/237
[58] Field of Search ...................... 525/237, 236, 332.9, 525/331.9, 342, 357, 359.1, 386

[56] References Cited

U.S. PATENT DOCUMENTS

| | | | |
|---|---|---|---|
| 4,104,332 | 8/1978 | Zelinski | 525/332.9 |
| 4,105,714 | 8/1978 | Trepka et al. | 525/322.9 |
| 4,224,197 | 9/1980 | Ueda et al. | 525/236 |
| 4,323,485 | 4/1982 | Ahagon et al. | 525/236 |
| 4,334,567 | 6/1982 | Bond | 526/340 |

FOREIGN PATENT DOCUMENTS

| | | |
|---|---|---|
| 1225392 | 9/1966 | Fed. Rep. of Germany ... 525/332.9 |
| 2071117 | 9/1981 | United Kingdom . |

Primary Examiner—Allan M. Lieberman
Attorney, Agent, or Firm—Armstrong, Nikaido, Marmelstein & Kubovcik

[57] ABSTRACT

A diene rubber composition comprising as a main rubber component an elastomeric polymer having a glass transition temperature of not less than −50° C. selected from the group consisting of a butadiene homopolymer and a copolymer of butadiene and an aromatic vinyl compound, said elastomeric polymer being one prepared by a solution polymerization method and not less than 40% by weight to less than 65% by weight of the polymer chains thereof being branched polymer chains formed by coupling the polymer molecules with each other with a trifunctional or tetrafunctional coupling agent. The composition has excellent rolling resistance characteristic, wet grip characteristic, processability, tear strength and tackiness, and is suitable particularly for use in the tread portion of tires.

6 Claims, No Drawings

DIENE RUBBER COMPOSITION AND TIRE USING IT IN TREAD

BACKGROUND OF THE INVENTION

The present invention relates to a diene rubber composition and a tire using the composition in the tread and more particularly, to a rubber composition which contains, as a main rubber component, an elastomeric butadiene homopolymer or elastomeric copolymer of butadiene and an aromatic vinyl compound prepared by a solution polymerization process using a coupling agent and which has a high wet skid resistance, a low rolling resistance and an excellent processability, as well as high tear strength and tackiness which are important in processing.

In recent years, the reduction of running fuel cost of automobiles is in strong demand from the viewpoint of energy saving. Especially, it is of urgent necessity for the tire manufacturing industry to decrease the rolling resistance of tires, because the rolling resistance has an important effect on fuel saving.

Among the constituent elements of a tire, a tread rubber accounts for the largest proportion of the travelling resistance dependent on rolling of the tire, and it is known that the tread rubber accounts for about 40% of the rolling resistance of the tire at large. The rolling resistance of a tire results from energy loss, accompanying repeated deformation of a running tire. Thus, the reduction of the rolling resistance is no more than reducing such an energy loss. Particularly, considering it with respect to the motion of a tread rubber, it is necessary to reduce energy loss due to a bending and shearing motion and a compressive motion. From the viewpoint of the dynamic viscoelastic characteristic of a rubber, this means reduction of the loss modulus (E'') and the loss compliance $[E''/(E^*)^2$ wherein $E^*$ is complex modulus]. Further, these motions are repeated motions dependent on rotation of a tire, and the frequency thereof is from 10 to $10^2$ Hz. Accordingly, it is necessary for the reduction of the rolling resistance of tires to decrease the loss modulus and loss compliance of a tread rubber in 10 to $10^2$ Hz.

On the other hand, considering from the safety side in running of a car, the wet grip characteristic is an important characteristic required for tires. It is a characteristic concerning travelling performances such as steering stability and breaking performance on a wet road, such as a road at the time of raining, and is a frictional resistance which is caused by contact of the treat surface of a tire with the road. In other words, since a tire shows a recovery from deformation with a time lag to a stress received from the road surface, a torque of a reverse direction to the running direction is generated. The resistance due to this torque is the frictional resistance, and is related to the loss coefficient (tan δ) from the viewpoint of the viscoelastic characteristic. Further, the frequency of the stress caused by the road is a very high frequency dependent on the unevenness of road, and according to the literature, the frequency is from $10^4$ to $10^7$ Hz. Therefore, in order to improve the wet grip characteristic of tires, it is necessary to raise the loss coefficient of a tread rubber in $10^4$ to $10^7$ Hz.

In a tread rubber compound generally and widely used heretofore, natural rubber, polyisoprene rubber, high-cis-1,4-polybutadiene rubber and styrene-butadiene rubber are mainly used as rubber components. The former three are superior in rolling resistance, but are poor in wet grip characteristic. On the other hand, a styrene-butadiene rubber is superior in wet grip characteristic, but is poor in rolling resistance. Therefore, a tread rubber composition which is excellent in both rolling resistance and the wet grip characteristic has not been obtained. A tread rubber composition has been used at the cost of either one property, or with keeping balance between the both properties by blending the above-mentioned elastomers. However, the present state is considered far from sufficient for the level demanded in recent years with regard to keeping a high wet grip characteristic and keeping a low rolling resistance at the same time.

The present inventors made a study of a polymer having excellent processabilities such as kneading processability, roll processability and extrusion processability required in tire manufacturing and a process for the preparation thereof as well as a fundamental study of the repugnant rolling and wet grip characteristics, and they found, as described in Japanese Patent Application No. 53387/1982, that a polymer having a particular structure has a high wet grip characteristic and an excellent rolling resistance characteristic together with an excellent processability. The proposed rubber compositions have excellent processability. The proposed rubber compositions have excellent features in having a high wet grip characteristic, a low rolling resistance and an excellent processability and in satisfying the level of tear strength and tackiness required in molding. The present inventors have continued the study in order to further improve these characteristics and have now reached the present invention.

It is an object of the present invention to provide a rubber composition suitable for use in the tread portion of tires.

A further object of the invention is to provide a rubber composition having improved wet grip characteristic, rolling resistance, processability, tear strength and tackiness.

These and other objects of the present invention will become apparent from the description hereinafter.

SUMMARY OF THE INVENTION

In accordance with the present invention, there is provided a diene rubber composition comprising an elastomeric polymer as a main rubber component and rubber additives, said elastomeric polymer being an elastomeric homopolymer of butadiene or copolymer of butadiene and an aromatic vinyl compound prepared by a solution polymerization method and having a glass transition temperature of not less than −50° C., and not less than 40% by weight to less than 65% by weight of the polymer chains of said elastomeric polymer being those modified with a trifunctional or tetrafunctional coupling agent.

DETAILED DESCRIPTION

Elastomeric polymers used in the present invention as a main rubber component are those containing polymer molecules modified with a trifunctional or tetrafunctional coupling agent, and are selected from elastomeric butadiene homopolymers and elastomeric copolymers of butadiene and an aromatic vinyl compound.

The aromatic vinyl compounds used in the present invention include, for instance, styrene, styrene derivatives having a substituent on the benzene ring such as m-methylstyrene, p-methylstyrene and p-tert-butylstyrene, styrene derivatives having a substituent on the vinyl group such as α-methylstyrene, and the like. In particular, styrene and p-methylstyrene are preferably employed because they are easily obtainable upon practicing on an industrial scale. The content of the aromatic vinyl compound in the copolymer is usually from 15 to 50% by weight.

It is necessary that the glass transition temperature of the elastomeric polymers is not less than $-50°$ C. When the glass transition temperature is less than $-50°$ C., the wet grip characteristic is lowered. The glass transition temperature of the polymer is determined by the microsturcture of the polymer, namely the 1,2-vinyl bonding content and the content of the aromatic vinyl compound. The glass transition temperature rises with increasing these contents.

The elastomeric polymers are in the form of composite molecules obtained by coupling the polymer molecules with a trifunctional or tetrafunctional coupling agent, and contain the coupled polymer and the uncoupled polymer It is necessary that the proportion of the polymer chains modified with a trifunctional or tetrafunctional coupling agent (i.e. coupled polymer) in the whole polymer chains of the elastomeric polymer is within the range between not less than 40% by weight and less than 65% by weight, preferably between not less than 47% by weight and not more than 58% by weight. When the proportion of the modified polymer chains is less than 40% by weight, the processability is lowered, thus a good rubber sheet is not obtained upon roll or calender processing. On the other hand, when the proportion is not less than 65% by weight, the tackiness of a rubber sheet is poor, thus resulting in lowering of the moldability such as difficulty in laminating sheets upon molding into a tire.

It is desirable that the elastomeric polymer has an intrinsic viscosity of 1.7 to 2.5 dl./g. measured in toluene at 30° C. When the intrinsic viscosity is less than 1.7, the rolling resistance becomes worse and the level required at present cannot be maintained. When the intrinsic viscosity is more than 2.5, the rolling resistance is satisfactory, but the processability such as kneading and extrusion becomes worse.

A known living anionic polymerization process using an alkali metal compound, such as an organolithium compound as a polymerization initiator, is preferable for the preparation of the elastomeric polymer used in the rubber composition of the present invention. After conducting the polymerization, the polymer molecules are coupled by reacting the active polymer ends with a coupling agent. In that case, the content of the polymer chains modified by the coupling agent can be controlled by the ratio of the amount of the active polymer ends to the amount of the coupling agent. Also, the content of the modified polymer chains can be determined from the molecular distribution measured by gel permeation chromatography. That is to say, the weight ratio of the modified polymer chains to unmodified polymer chains is defined by the relative ratio of the height of a peak corresponding to the average molecular weight of the modified polymer chains (coupled polymer) to the height of a peak corresponding to the average molecular weight of the unmodified polymer chains (uncoupled polymer). The coupling is carried out in a conventional manner by using a trifunctional or tetrafunctional coupling agent. Typical examples of the coupling agent are, for instance, a compound having 3 or 4 halogen atoms such as trichloromethylsilane, silicon tetrachloride, tin tetrachloride, titanium tetrachloride, tetrabromobenzene or trichlorobenzene, and a dicarboxylic acid ester such as dimethyl adipate, diethyl adipate, dioctyl adipate, diethyl fumarate, dimethyl maleate or dioctyl maleate.

For the purpose of further improving the tackiness, the rubber composition of the present invention may contain a linear or branched low molecular butadiene homopolymer or a linear or branched low molecular copolymer of butadiene and an aromatic vinyl compound in an amount of 1 to 10 parts by weight, preferably 1 to 5 parts by weight, per 100 parts by weight of the elastomeric polymer defined above. The use of the low molecular polymer in an amount of less than 1 part by weight is insufficient for improving the tackiness. When the amount of the low molecular polymer is more than 10 parts by weight, the rolling resistance becomes worse. It is preferable that the instrinsic viscosity of the low molecular polymer is from 0.1 to 1.0 dl./g., especially from 0.5 to 0.85 dl./g., in toluene at 30° C. When the intrinsic viscosity is less than the above range, the rolling resistance becomes worse or the stringing phenomenon from a rubber sheet occurs upon processing. When the intrinsic viscosity is more than the above range, the effect on improvement of the tackiness is poor.

Although it is a matter of course that the elastomeric polymers defined above can be employed alone as a rubber component of the composition, they can also be employed with other rubbers such as natural rubber, synthetic isoprene rubber and an emulsion polymerized styrene-butadiene rubber. In that case, from the viewpoint of the overall balance between rolling resistance, wet grip characteristic, processability and tackiness, it is preferable to employ natural rubber, synthetic isoprene rubber or a mixture thereof in an amount of not more than 30 parts by weight based on 100 parts by weight of the whole rubber components. When the amount is more than 30 parts by weight, the wet grip characteristic is lowered. The use of natural rubber and/or synthetic isoprene rubber in an amount of 5 to 25 parts by weight is more preferable in improving the moldability such as tackiness, while maintaining processability, rolling resistance and wet grip characteristic in good balance.

Usual additives used in processing and molding of tire elements may be added to the rubber composition of the present invention, e.g. carbon black, process oil, wax, antioxidant, curing agent and curing accelerator.

The thus prepared rubber composition is employed in treads of various tires, for instance, tires for passenger car, light truck, large truck, bus and motor cycle, thus providing tires having excellent rolling resistance characteristic and wet grip characteristic.

The present invention is more specifically described and explained by means of the following Examples in which all % and parts are by weight unless otherwise noted. It is to be understood that the present invention is not limited to the Examples, and various changes and modifications may be made in the invention without departing from the spirit and scope thereof.

EXAMPLES 1 to 3 and Comparative Examples 1 and 2

Styrene and butadiene were copolymerized in a mixed solvent of tetrahydrofuran and hexane in the presence of n-butyllithium as a polymerization initiator at 50° C. for 4 hours. After the completion of the polymerization, silicon tetrachloride was added to the reaction mixture and reacted at 50° C. for 30 minutes to produce a polymer having coupled branches. The polymer was recovered by a methanol precipitation method.

The properties of the obtained polymers are shown in Table 1.

Rubber compositions were prepared by mixing each of the obtained polymers with rubber additives according to the following formulation.

| Components | Amount (part) |
| --- | --- |
| Elastomeric polymer | 100 |
| Aromatic oil | 20 |
| Stearic acid | 2 |
| Sulfur | 1.6 |
| Carbon black | 60 |
| Zinc oxide | 5 |
| Curing accelerator | 2 |

Physical properties of the rubber compositions and cured compositions were measured.

The results are shown in Table 1.

The measurements were made as follows:

Intrinsic viscosity [η]

The measurement was made at 30° C. in toluene solvent by employing an Ostwald's viscometer.

Glass transition temperature

The measurement was made by raising the temperature at a rate of 20° C./minute employing a diferential scanning calorimeter made by E. I. du Pont de Nemours & Co. The transition temperature was determined from the position of the transition heat absorption peak.

Roll processability

The temperature of 6 inch rolls was adjusted to 50° C., and the roll spacing was adjusted to 0.7, 1.0, 1.5 or 2.0 mm. A polymer or a polymer mixture was wound round the roll, and the state of the polymer was observed and estimated according to the following criteria.

| Grade | State of polymer on roll |
| --- | --- |
| 5: | Winding state is very good, sheet skin is smooth and sheet has a tackiness. |
| 4: | Winding state is good, but sheet edge breaking occurs or sheet skin is somewhat rough. |
| 3: | Rubber sheet wound on the roll is lacking in tackiness or biting into rolls of bank is somewhat bad. |
| 2: | Bagging and sheet breaking occur. |
| 1: | Biting into rolls in an early stage is bad, and the polymer is not formed into a sheet and does not wind round the roll. |

Proportion of modified polymer clains in polymer

A high pressure liquid chromatograph HLC-802UR made by Toyo Soda Manufacturing Co., Ltd. was used, and columns of $10^3$, $10^4$, $10^6$ and $10^7$ were selected as distribution columns. A refractometer was used as a detector. The molecular distribution of a polymer was measured at 40° C. by using tetrahydrofuran as a developing solvent. The relative ratio of the height of the peak corresponding to the average molecular weight of the modified polymer chains to the height of the peak corresponding to the average molecular weight of the nonmodified polymer chains was regarded as the weight ratio of the respective polymer chains.

Wet grip characteristic

The wet skid resistance was measured by employing a portable skid resistance tester made by Stanley with respect to a cured rubber sheet having a thickness of 6.5 mm. An asphalt surface sprayed with water of 20° C. was employed as a contact road surface.

Dynamic loss value

The measurement was made by varying the temperature of a cured rubber sheet at 0.6% in initial elongation, 0.1% in amplitude and 11 Hz in frequency employing a dynamic solid viscoelastometer made by Toyo Baldwin Co., Ltd.

Tear strength

The tear strength was measured according to JIS K 6301 with respect to a B-type specimen of a cured rubber.

Tackiness

The measurement was made with a cured rubber specimen by employing a pick-up type tack meter made by Toyo Seiki Kabushiki Kaisha under the conditions: pressure adhesion load 500 g., pressure adhesion time 10 seconds and peeling off rate 10 mm./sec.

TABLE 1

|  | Ex. 1 | Ex. 2 | Ex. 3 | Com. Ex. 1 | Com. Ex. 2 |
| --- | --- | --- | --- | --- | --- |
| Polymer |  |  |  |  |  |
| Intrinsic viscosity (dl./g.) | 1.96 | 1.86 | 2.04 | 1.38 | 2.31 |
| Proportion of modified polymer chains (%) | 58 | 48 | 50 | 49 | 85 |
| Styrene content (%) | 24 | 25 | 26 | 23 | 26 |
| Vinyl content in diene portion (mole %) | 39 | 37 | 40 | 20 | 39 |
| Glass transition temp. (°C.) | −45 | −46 | −42 | −57 | −40 |
| Wet grip characteristic | 60 | 59 | 61 | 57 | 61 |
| Dynamic loss values |  |  |  |  |  |
| E'' (kg./cm.$^2$) | 19.2 | 18.7 | 17.1 | 23.4 | 17.6 |
| [E''/(E*)$^2$] × $10^3$ (kg./cm.$^2$)$^{-1}$ | 0.74 | 0.70 | 0.71 | 0.86 | 0.94 |
| Roll processability |  |  |  |  |  |
| Roll spacing  0.7 mm. | 4 | 4 | 4 | 3 | 5 |
|              1.0 mm. | 5 | 5 | 5 | 3 | 5 |
|              1.5 mm. | 4 | 5 | 4 | 2 | 5 |
|              2.0 mm. | 4 | 4 | 4 | 2 | 4 |
| Tear strength (150° C.) (kg./cm.) | 21 | 23 | 20 | 18 | 16 |

TABLE 1-continued

|  | Ex. 1 | Ex. 2 | Ex. 3 | Com. Ex. 1 | Com. Ex. 2 |
|---|---|---|---|---|---|
| Tackiness (g./15 mm.) | 860 | 710 | 670 | 600 | 390 |

The rubber compositions of Examples 1 to 3 according to the present invention show high wet grip characteristic of 59 to 61, low dynamic loss values $E''$ and $E''/(E^*)^2$, an excellent roll processability, high tear strength of 20 to 23 kg./cm. at 120° C. and high tackiness of not less than 670 g./15 mm.

On the other hand, the rubber composition of Comparative Example 1 containing a polymer having a low intrinsic viscosity, i.e. 1.38 dl./g. and a low glass transition temperature, i.e. $-57°$ C., shows a large dynamic loss, namely $E''$ value of 23.4 kg./cm.$^2$, and a low wet grip characteristic 57. These values are approximately the same as those observed in a rubber composition containing as a rubber component a usual emulsion-polymerized styrene-butadiene copolymer (commercially available under the commercial name "SBR #1500" made by Sumitomo Chemical Co., Ltd.).

Also, the rubber composition of Comparative Example 2 containing a polymer where the proportion of the branched polymer chains produced by modification with a coupling agent is high, namely 85%, shows a high wet grip characteristic, a low dynamic loss and a good roll processability, but are insufficient in tear strength and tackiness.

The rubber compositions of Comparative Examples 1 and 2 are not suitable for attaining the objects of the present invention.

EXAMPLE 4

A polymer (A) containing branched polymer chains was prepared in the same manner as in Examples 1 to 3, and a rubber composition was prepared in the same manner as in Examples 1 to 3 except that a blend of 96 parts of the polymer (A) and 4 parts of a linear butadiene polymer (B) containing a vinyl content of 50% by mole was employed as a rubber component.

The results are shown in Table 2.

It is observed in Table 2 that the rubber composition of Example 4 according to the present invention shows high tear strength and tackiness as well as a high wet grip characteristic, low dynamic loss values and a good roll processability, thus has a good practicality.

TABLE 2

|  | Ex. 4 |
|---|---|
| Polymer (A) |  |
| Intrinsic viscosity (dl./g.) | 2.00 |
| Proportion of modified polymer chains (%) | 56 |
| Styrene content (%) | 26 |
| Vinyl content in diene portion (mole %) | 40 |
| Glass transition temperature (°C.) | −44 |
| Polymer (B) |  |
| Intrinsic viscosity (dl./g.) | 0.83 |
| Vinyl content (mole %) | 50 |
| Polymer (A)/polymer (B) blending ratio | 96/4 |
| Wet grip characteristic | 61 |
| Dynamic loss values |  |
| $E''$ (kg./cm.$^2$) | 17.6 |
| $[E''/(E^*)^2] \times 10^3$ (kg./cm.$^2$)$^{-1}$ | 0.73 |
| Roll processability |  |
| Roll spacing 0.7 mm. | 4 |
| 1.0 mm. | 5 |
| 1.5 mm. | 5 |
| 2.0 mm. | 4 |
| Tear strength (150° C.) (kg./cm.) | 22 |

TABLE 2-continued

|  | Ex. 4 |
|---|---|
| Tackiness (g./15 mm.) | 690 |

EXAMPLES 5 AND 6

Rubber compositions were prepared by employing as a rubber component a blend of 80 parts of the polymer of Example 1 or the mixture of the polymers (A) and (B) of Example 4, with 20 parts of natural rubber, and the physical properties were measured in the same manner as in Examples 1 to 3.

The results are shown in Table 3.

As shown in Table 3, the compositions of Examples 5 and 6 according to the present invention using the specific branched polymer in combination with natural rubber show low dynamic loss values, a very excellent roll processability and improved tear strength and tackiness without impairing the wet grip characteristics, and are of high practical value.

TABLE 3

|  | Ex. 5 | Ex. 6 |
|---|---|---|
| Polymer | Polymer of Ex. 1 | Polymers (A) and (B) of Ex. 4 |
| Amount of natural rubber | 20 parts | 20 parts |
| Wet grip characteristic | 60 | 61 |
| Dynamic loss values |  |  |
| $E''$ (kg./cm.$^2$) | 18.2 | 17.0 |
| $[E''/(E^*)^2] \times 10^3$ (kg./cm.$^2$)$^{-1}$ | 0.76 | 0.74 |
| Roll processability |  |  |
| Roll spacing 0.7 mm. | 4 | 5 |
| 1.0 mm. | 5 | 5 |
| 1.5 mm. | 5 | 5 |
| 2.0 mm. | 4 | 4 |
| Tear strength (150° C.) (kg./cm.) | 23 | 24 |
| Tackiness (g./15 mm.) | 1030 | 850 |

Next, steel radial tires of 165SR13 in tire size were prepared by using the rubber compositions prepared in Examples 1 to 6 and Comparative Examples 1 and 2 in the tread portion of the tires. The mixing and extrusion processability and the moldability were estimated upon the preparation according to the following criteria, and the rolling resistance index and wet grip index of the tires were measured as follows:

Mixing and extrusion processability

Grade

5: Sheet skin is good, and a composition can be easily extruded without bagging.

4: A composition does not crumble on a roll, thus lumping is good, and bagging does not occur, but the skin of the extrudate is somewhat bad.

3: Bagging slightly occurs on a roll, and the skin is bad.

2: Lumping is somewhat bad and bagging occurs on a roll.

1: A composition lacks in lumping, thus a composition does not form sheets and cannot be extruded.

Moldability

Grade

5: Tackiness is very good, and a composition can be easily molded.
4: Tackiness is common, but there is a case where a joint slightly starts after molding.
3: Tackiness is somewhat poor, and the adhesion of the jointed portion is bad.
2: Tackiness is poor, and molding is difficult.
1: There is no tackiness and molding is impossible.

Rolling resistance index

The above-mentioned tire was attached to a rim of 4½J X 13, and the rolling resistance was measured by causing the tire to run on a 60 inch drum under conditions of 2.0 kg./cm.$^2$ in inner air pressure, 300 kg. in load and 80 km./hour in speed. The rolling resistance was represented as an index to the result of Comparative Example 1. The smaller the rolling resistance index, the more excellent the rolling resistance characteristic.

Wet grip index

The coefficient of friction was measured on a wet concrete road by employing a trailer testing machine according to ASTM E274 under conditions of 328 kg. in load and 60 km./hour in speed. The wet grip characteristic was represented as an index of the measured value to that of Comparative Example 1. The larger the wet grip index, the more excellent the wet grip characteristic.

The results are shown in Table 4.

From the results shown in Table 4, it is understood that the rubber compositions of the present invention are very good in mixing and extrusion processability and moldability required in preparation of tires, and are also excellent in tire performance, namely have excellent rolling resistance characteristic and wet grip characteristic.

In addition to the ingredients used in the Examples, other ingredients can be used in the Examples as set forth in the specification to obtain substantially the same results.

TABLE 4

| Composition used in tread | Ex. 1 | Ex. 2 | Ex. 3 | Ex. 4 | Ex. 5 | Ex. 6 | Com. Ex. 1 | Com. Ex. 2 |
|---|---|---|---|---|---|---|---|---|
| Mixing and entrusion processability | 5 | 5 | 5 | 5 | 5 | 5 | 4 | 3 |
| Moldability | 5 | 5 | 5 | 5 | 5 | 5 | 3 | 2 |
| Rolling resistance index | 93 | 92 | 90 | 91 | 92 | 90 | 100 | 93 |
| Wet grip index | 105 | 104 | 105 | 106 | 104 | 105 | 100 | 105 |

What we claim is:

1. A diene rubber composition comprising an elastomeric polymer as a main rubber component and rubber additives, said elastomeric polymer being an elastomeric homopolymer of butadiene or copolymer of butadiene and an aromatic vinyl compound prepared by a solution polymerization method and having a glass transition temperature of not less than −50° C. and an intrinsic viscosity of 1.7 to 2.5 dl./g. at 30° C. in toluene, and not less than 40% by weight to less than 65% by weight of the polymer chains of said elastomeric polymer being those modified with a trifunctional or tetrafunctional coupling agent selected from the group consisting of trichloromethylsilane, silicon tetrachloride, tin tetrachloride, titanium tetrachloride, tetrabromobenzene, trichlorobenzene, dimethyl adipate, diethyl adipate, dimethyl maleate, dioctyl maleate, dioctyl adipate and diethyl fumarate.

2. The composition of claim 1, wherein the proportion of the polymer chains modified with the coupling agent is from 47 to 58% by weight.

3. The composition of claim 1, wherein said elastomeric polymer is employed in combination with 1 to 10 parts by weight of a linear or branched low molecular weight polymer per 100 parts by weight of said elastomeric polymer, said linear or branched low molecular weight polymer having an intrinsic viscosity of 0.1 to 1.0 dl./g. in toluene at 30° C. and being selected from the group consisting of a butadiene homopolymer and a copolymer of butadiene and an aromatic vinyl compound.

4. The composition of claim 3, wherein said linear or branched low molecular weight polymer has an intrinsic viscosity of 0.5 to 0.85 dl./g. in toluene at 30° C. and is employed in an amount of 1 to 5 parts by weight per 100 parts by weight of said elastomeric polymer.

5. The composition of claim 1, wherein said elastomeric polymer is employed in combination with at most 30 parts by weight of, based on 100 parts by weight of the whole rubber component, a rubber selected from the group consisting of natural rubber and synthetic isoprene rubber.

6. A tire whose tread is made from a rubber composition comprising an elastomeric polymer and rubber additives, said elastomeric polymer being an elastomeric homopolymer of butadiene or copolymer of butadiene and an aromatic vinyl compound prepared by a solution polymerization method and having a glass transition temperature of not less than −50° C. and an intrinsic viscosity of 1.7 to 2.5 dl./g. at 30° C. in toluene, and not less than 40% by weight to less than 65% by weight of the polymer chains of said elastomeric polymer being those modified with a trifunctional or tetrafunctional coupling agent selected from the group consisting of trichloromethylsilane, silicon tetrachloride, tin tetrachloride, titanium tetrachloride, tetrabromobenzene, trichlorobenzene, dimethyl adipate, diethyl adipate, dioctyl adipate, diethyl furmarate, dimethyl maleate and dioctyl maleate.

* * * * *